United States Patent [19]
Behrens et al.

[11] 3,836,859
[45] Sept. 17, 1974

[54] CONTROL CIRCUIT FOR PREVENTING THE RESPONSE OF A PROGRAMMED CONTROLLER TO SIMULTANEOUSLY GENERATED CONTROL SIGNALS

[75] Inventors: Dieter Behrens; Lothar Wache, both of Erlangen, Germany

[73] Assignee: Siemens Aktiengesellschaft, Munich, Germany

[22] Filed: Apr. 5, 1973

[21] Appl. No.: 348,277

[30] Foreign Application Priority Data
Apr. 6, 1972 Germany.............................. 2216591

[52] U.S. Cl...................... 328/75, 328/70, 328/71, 328/207, 307/217, 307/218, 328/110
[51] Int. Cl...................... H03k 17/26, H03k 17/28
[58] Field of Search......... 307/217, 218, 72, 73, 74, 307/75, 99, 70, 71, 207; 328/110

[56] References Cited
UNITED STATES PATENTS

| | | | |
|---|---|---|---|
| 3,277,381 | 10/1966 | Sullivan | 307/217 X |
| 3,571,729 | 3/1971 | Honma | 307/217 X |
| 3,697,139 | 10/1972 | Elliott et al. | 307/217 X |
| 3,723,889 | 3/1973 | Oberst | 307/217 X |

*Primary Examiner*—John S. Heyman
*Attorney, Agent, or Firm*—Kenyon & Kenyon Reilly Carr & Chapin

[57] ABSTRACT

A control circuit for preventing the response of a programmed controller to a plurality of simultaneously generated control signals, comprising a plurality of AND gates coupled to the signal generators of the controller; a monostable flip-flop means coupled to the outputs of the and gates for generating a first gate control signal whenever two or more control signals are generated simultaneously by the signal generators; and a bistable flip-flop means, coupled to the monostable flip-flop means, for generating a second gate control signal a predetermined time period after generation of the first gate control signal. The first and second gate control signals prevent the generation of output signals by the AND gates and the transmission of the signals to control signal storage devices in the controller.

10 Claims, 2 Drawing Figures

PATENTED SEP 17 1974  3,836,859

CONTROL CIRCUIT FOR PREVENTING THE RESPONSE OF A PROGRAMMED CONTROLLER TO SIMULTANEOUSLY GENERATED CONTROL SIGNALS

BACKGROUND OF THE INVENTION

The invention relates to programmed controllers, and in particular, to a control circuit for preventing the response of a programmed controller to a plurality of simultaneously generated control signals.

SUMMARY OF THE INVENTION

It is an object of the invention to provide a control circuit for a programmed controller which immediately prevents the generation of further control signals whenever two or more control signals are generated simultaneously.

It is another object of the invention to provide a control circuit which automatically permits the control signal generators of the controller to resume the generation of control signals if the fault condition causing simultaneous generation of control signals is temporary.

It is still another object of the invention to provide a control circuit for indicating a fault condition and permanently preventing the generation of control signals when the fault condition persists for an extended period of time.

According to the invention, the above objects are achieved by providing, in a programmed controller including a plurality of control signal generators, a control circuit for preventing response by the controller to a plurality of control signals generated simultaneously thereby. The circuit comprises AND logic gate means, having at least one non-inverting input terminal and an inverting input terminal, coupled to the control signal generators; first means, coupled to the gate means, for generating a first gate means control output signal whenever two or more control signals are generated simultaneously by the control signal generators; and second means, coupled to the first means and the gate means, for generating a second gate means control output signal subsequent and in response to the first output signal. Generation of the first output signal prevents generation of output signals by the gate means in response to simultaneous control signals for a predetermined time period, and generation of the second output signal prevents generation thereof permanently, thereby preventing response of the controller to simultaneous control signals. A highly reliable control circuit for preventing damage to the controller or error in its operation is thereby achieved.

BRIEF DESCRIPTION OF THE DRAWINGS

Throughout the several views of the drawings, similar reference numerals are used to denote similar elements shown therein.

DETAILED DESCRIPTION

It is to be understood that the embodiment of the invention illustrated in the accompanying drawings and described in the following detailed description is an illustrative example only, and it is not intended that the drawings and description comprise a definition of the limits and scope of the invention disclosed herein.

Figure 1:
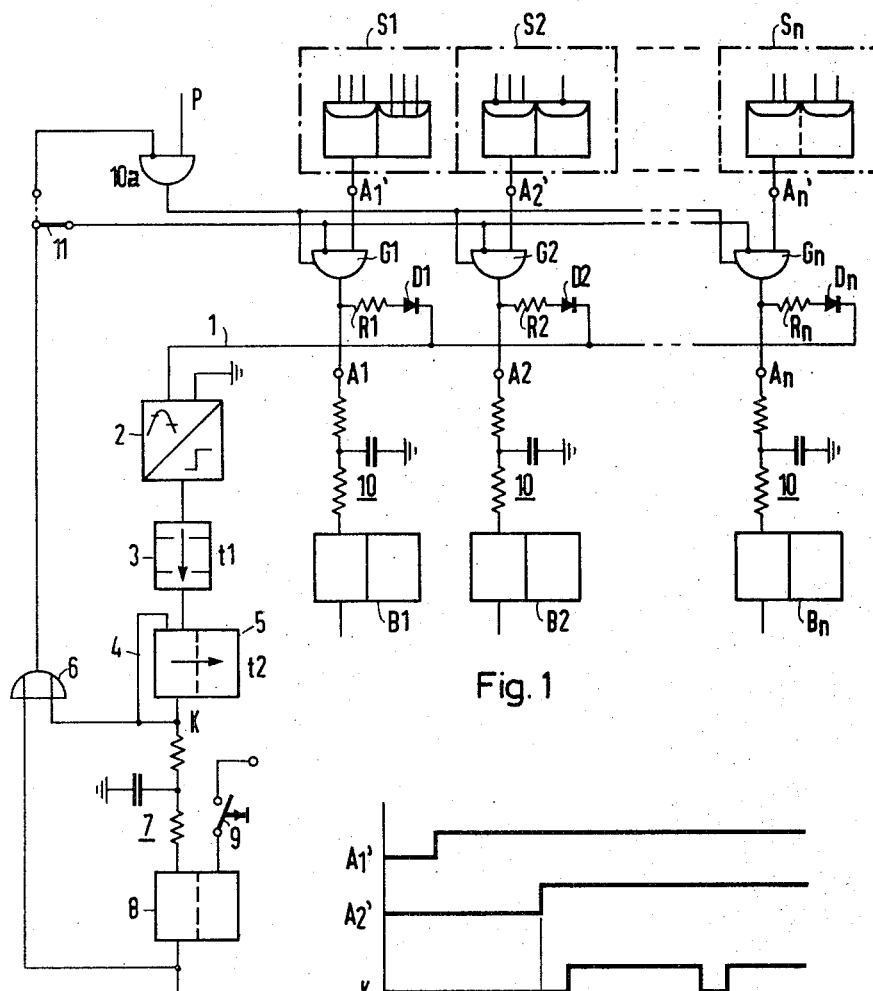
FIG. 1 is a schematic diagram of a control circuit constructed according to the invention.

Referring now to the drawings, specifically FIG. 1, there is shown a plurality of control signal generators S1, S2 . . . SN of a programmed controller. The signal generators comprise control signal storage devices containing logic circuits which release a control signal representing a command from each generator. When the programmed controller operates properly, a DC voltage step signal appears at only one of the output terminals of the signal generators, which are designated as terminals A1', A2' . . . AN'. Each of these control signals causes generation of additional control signals which are transmitted to a plurality of control signal storage devices, designated as B1, B2 . . . BN, coupled to the signal generators. It often happens, however, that control signals appear simultaneously at the signal generator output terminals. To prevent error or damage the transmission of the additional control signals to the control signal storage devices must be blocked.

To achieve this objective the invention provides a plurality of AND logic gate means having inverting and non-inverting input terminals, illustrated as AND gates G1, G2 . . . GN which have the non-inverting input terminals thereof coupled to the output terminals A1', A2'. . . AN' of the control signal generators. The output terminals of the AND gates are coupled by RC filters 10 to control signal storage devices B1, B2 . . . BN. The gate output terminals are also coupled by resistors R1, R2 . . . RN and diodes D1, D2 . . . DN to a bus conductor 1 which is coupled to the input terminal of a signal generating means, illustrated as signal monitor 2. The input signal threshhold level of signal monitor 2 is set so that it is responsive only to an input signal which is greater in magnitude than the magnitude of any one additional control signal transmitted by a gate thereto. In other words, signal monitor 2 is activated only when at least two additional control signals appear simultaneously at the output terminals of two of gates G1, G2 . . . GN. A combination of two control signals transmitted to the signal monitor causes the generation thereby of a DC voltage step output flip-flop control signal. A time delay means shown as time delay device 3, couples the signal monitor to a monostable flip-flop 5 which has a feedback conductor 4 coupled to the "set" input and the output terminals thereof. The resistors, diodes, signal monitor, time delay device and flip-flop comprise a first means for generating a first gate means control output signal. The output terminal of flip-flop 5 is coupled to one input terminal of an OR gate 6, and to a second means for generating a second gate means control output signal, comprising bistable flip-flop 8 and a time delay means shown as RC filter 7. The filter is coupled to the "set" input terminal of the bistable flip-flop and a reset switch 9 is coupled to the "reset" terminal thereof. The other input of OR gate 6 is coupled to the output terminal of bistable flip-flop 8.

A switching means, shown as switch 11, whose base is coupled to the output terminal of OR gate 6, couples in a first position the output terminals of the OR gate and flip-flops 5 and 8 to the inverting input terminals of gate G1, G2. . . GN, or, alternatively, in its second position to the inverting input terminal of an additional AND logic gate means, illustrated as AND gate 10a. A DC voltage source P is coupled to the non-inverting input terminal of the AND gate. Gates G1, G2 ... GN each have a third non-inverting input terminal which is coupled to the output terminal of gate 10a.

Figure 2:
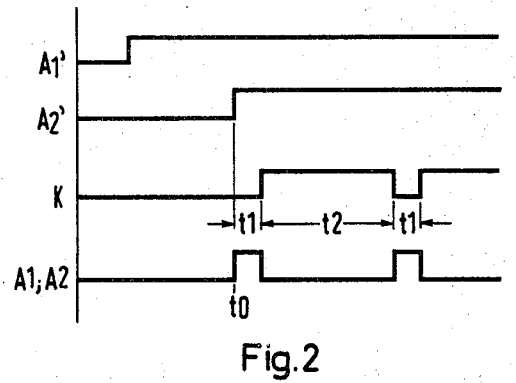
FIG. 2 is a graphical illustration of the control signals generated by the controller and the control circuit of the invention.

The operation of the control circuit will now be described with further reference to FIG. 2:

If, as is shown in FIG. 2, a control signal appears at output terminal A1' of signal generator S1 the control signal causes gate G1 to generate a control signal which is transmitted to monitor 2 through resistors R1 and diode D1, and to control signal storage device B1 through filter 10. Since the magnitude of the control signal generated by the gate is less than the threshhold level of the signal monitor, the controller is permitted to operate normally without interference. If, however, a second control signal appears, as is also shown in FIG. 2, at the output A2' of signal generator S2 during the duration of the control signal generated by signal generator S1, two control signals are transmitted by gates G1 and G2, to bus conductor 1 and signal monitor 2. Since the combined magnitudes of the signals exceed the threshhold level of the monitor, a DC voltage step output signal is generated by the signal monitor. Both of the control signals generated by the gates in response to the signals generated by signal generators S1 and S2 are also transmitted to filters 10 coupled to control signal storage devices B1 and B2. However, as will be described later on herein, filters 10 act as a time delay means, and both delay transmission of the gate signals to the signal storage devices and decrease the magnitude of the signals transmitted over a predetermined time delay period. The flip-flop control step signal generated by signal monitor 2 is transmitted by time delay device 3 monostable flip-flop 5 with the time delay t1. The step signal transmitted sets flip-flop 5 and generates a first gate control step signal at output terminal K. The output signal at terminal K is transmitted through one input terminal of OR gate 6 to switch 11 and the inverting input terminals of gates G1, G2 ... GN. The presence of the signal at these input terminals immediately stops generation of control signals by all of the gates. The signal input to monitor 2 accordingly drops to 0, as does the step signal generated thereby. Flip-flop 5 does not return to its monostable state immediately, but only after the expiration of time period $t2$. The flip-flop remains in its "set" state in which the step output signal thereof is generated, for the time period t2 due to the feedback conductor 4. The pulse generated by flip-flop 5 at output K, whose duration is equal to $t2$, is shown in FIG. 2.

Time delay device 3 delays transmission of the step signal generated by signal monitor 2 by predetermined time period $t1$. This time period may for example, be 0.1 ms. This prevents the setting of flip-flop 5 by noise or other interference present in the control circuit whose duration is less than the time delay period $t1$. The time period $t2$, during which flip-flop 5 is set, is preferably chosen to be one order of magnitude greater than delay time t1. Time period $t2$ may, thus, be approximately 1 ms. If simultaneous control signals appear continuously at output terminals A1' and A2', as is shown in FIG. 2, the described control circuit operation is carried out in continuous repetitive cycles, and a plurality of pulses of duration $t2$ and $t1$ appear at output K of flip-flop 5 and at the inputs A1 and A2 of filters 10, respectively, of devices B1 and B2.

The output signal at output K of flip-flop 5 is also coupled by a time delay means, illustrated as filter 7, to bistable flip-flop 8. The filter and flip-flop combination function as a memory for storing the output signal of flip-flop 5. The values of the resistors and capacitor of the filter are chosen so that any output signal at output terminal K is delayed for a time period which is greater than the duration of the time delay $t1$ and the duration of the output signal which appears at output terminal K of flip-flop 5. This time period can be chosen to be of a duration ranging from a time period of $(t1 + t2)$ to a time period of any multiple of the total time period $(t1 + t2)$. After the selected time delay period expires, the output signal at terminal K is coupled by filter 7 to the "set" terminal of flip-flop 8, and the bistable flip-flop is set in its state which produces a second gate control output signal at the output terminal thereof coupled to OR gate 6. A continuous DC voltage step output signal is transmitted through switch 11 to the inverting input terminals of gates G1, G2 ... Gn, and the generation of control signals by the gates in response to the signals of signal generators S1 and S2 is permanently prevented. To reset flip-flop 8, and restart generation of the control signals to the control signal storage devices, reset switch 9 is closed. Flip-flop 8 then returns to its previous state, and the signal applied to the inverting input terminals of gates G1, G2 ... GN is removed. The controller then operates normally.

Time delay period $t1$ may if desired, be adjusted to provide an extremely small time delay so as to ensure that control signal storage devices B1, B2 ... BN do not respond to simultaneous control signals applied to input terminals A1, A2 ... AN. Where a greater time delay period t1 is desired, and it is desired to prevent response by control signal storage devices B1, B2 ... BN, filters 10 may be used to couple gates G1, G2 ... GN to the signal storage devices. The filters are designed so that the rise time constants thereof are equal to the decay time constants thereof. If the pulse-interval ratio $t1/t2$ is chosen to be sufficiently small in magnitude, which, using the times used as examples herein, would be approximately 0.1, the control signal generated by each of the gates decays to a magnitude of 0 during time period $t2$. This objective can, of course, also be achieved for larger pulse-interval ratios by properly choosing the rise and decay time constants of filters 10.

In the embodiment of the invention described so far, the reliability of the operation of the control circuit depends upon the proper functioning of gates G1, G2 ... GN, i.e., the signals transmitted thereto from OR gate 6 must always cause the gates to cease generation of control signals in response to the signals generated by the control signal generators. If further reliability is desired, gates G1, G2 ... GN may be designed so that they include active switching elements, such as, for example, switching transistors. In such an embodiment, the output terminal of OR gate 6 is coupled by switch 11 in its vertical position to the inverting input terminal of AND gate 10a. The signal normally generated by gate 10a and transmitted to the third input terminals of gates G1, G2 ... GN does not appear at the output thereof whenever a signal is generated by OR gate 6. Whenever simultaneous control signals are generated by the control signal generators, this embodiment of the invention reliably stops generation of control signals by the gates. Such an arrangement also serves to prevent damage by other fault conditions, such as when, for example, one of the switching transistors becomes fused and a continuous control signal is applied to one of the control signal storage devices. The next control signal generated triggers gate 6, and the control circuit permanently stops generation of control signals by the gates, thus preventing damage by the fault condition to the controller.

While there has been disclosed herein one of the embodiments of the invention, it will be obvious to those persons skilled in the art that various changes and modifications may be made thereunto without departing from the invention, and it is therefore intended in the appended claims to cover all such changes and modifications as fall within the true spirit and scope of the invention.

What is claimed is:

1. In a programmed controller including a plurality of control signal generators, a control circuit for preventing response by the controller to a plurality of control signals generated simultaneously thereby comprising:
   a. a plurality of logic gates each having an input coupled to a respective one of said plurality of control signal generators;
   b. first means coupled to the outputs of all of said gates for generating first gate control output signals for a predetermined time period whenever two or more control signals are generated simultaneously by the control signal generators;
   c. second means coupled to said first means for generating a second gate control output signal in response to a sequence of said first output signals; and
   d. means coupling said first and second gate control output signals as disabling inputs to all of said plurality of logic gates, whereby generation of output signals by said gate means in response to simultaneous control signals for a predetermined time period, and generation of said second output signal prevents generation thereof permanently, thereby preventing response to the controller to simultaneous control signals.

2. The control circuit as recited in claim 1 wherein said first means includes a monostable multivibrator having its output terminal coupled as said disabling input to all of said gate means.

3. The control circuit as recited in claim 2, wherein said first means further includes signal generating means for generating a flip-flop control output signal, and time delay means coupled to said signal generating means, for delaying transmission of said flip-flop control output signal to said monostable flip-flop.

4. The control circuit as recited in claim 3 wherein said time delay means delays transmission of said flip-flop control signal for a period of time which is one order of magnitude less than the duration of said first gate means control output signal.

5. The control circuit as recited in claim 1, wherein said second means comprises time delay means and a bistable flip-flop coupled thereto, said time delay means delaying transmission of said first gate means control output signal to said bistable flip-flop for a time period which is greater than the duration of said predetermined time period.

6. The control circuit as recited in claim 5, wherein said time delay means comprises an RC filter.

7. The control circuit as recited in claim 1 where each of said gate means comprises an AND gate having at least a non-inverting input and an inverting input and wherein the respective non-inverting inputs of said AND gates are coupled to said control signal generators and the inverting input terminals of all of said gates are coupled to said first and second output signals.

8. The control circuit as recited in claim 1 wherein said AND gates have at least two non-inverting inputs, one of which is coupled to respective ones of the control signal generators and further including an additional AND gate coupling said first and second output signals to a second non-inverting input of all of said plurality of AND gates, said additional AND gate being arranged to provide a disabling input to all of said plurality of AND gates in response to said first output signal and in response to said second output signal.

9. The control circuit as recited in claim 1, wherein the programmed controller also includes control signal storage means, coupled to said gate means, and time delay means, coupled to said storage means and said gate means, for delaying transmission of the control signals generated by said gate means to said storage means.

10. The control circuit as recited in claim 9 wherein said time delay means comprises an RC filter.

* * * * *

UNITED STATES PATENT OFFICE
CERTIFICATE OF CORRECTION

Patent No. 3,836,859　　　　　　　　Dated September 17, 1974

Inventor(s) Dieter Behrens, Lothar Wache

It is certified that error appears in the above-identified patent and that said Letters Patent are hereby corrected as shown below:

In the Abstract, line 6, change "and gates" to --AND gates--

In column 3, line 47, change "...t2 due to the feedback conductor 4." to --...t2 due to the feedback signal transmitted to its input terminal by feedback conductor 4.--

Signed and sealed this 3rd day of December 1974.

(SEAL)
Attest:

McCOY M. GIBSON JR.　　　　　　C. MARSHALL DANN
Attesting Officer　　　　　　　　Commissioner of Patents